United States Patent
Chou et al.

(10) Patent No.: US 12,081,401 B2
(45) Date of Patent: Sep. 3, 2024

(54) SUPPORTING SON FUNCTIONS ON NETWORK SLICE INSTANCES

(71) Applicant: Apple Inc., Cupertino, CA (US)

(72) Inventors: Joey Chou, Scottsdale, AZ (US); Yizhi Yao, Chandler, AZ (US)

(73) Assignee: Apple Inc., Cupertino, CA (US)

( * ) Notice: Subject to any disclaimer, the term of this patent is extended or adjusted under 35 U.S.C. 154(b) by 217 days.

(21) Appl. No.: 16/485,088

(22) PCT Filed: Mar. 14, 2018

(86) PCT No.: PCT/US2018/022445
§ 371 (c)(1),
(2) Date: Aug. 9, 2019

(87) PCT Pub. No.: WO2018/170135
PCT Pub. Date: Sep. 20, 2018

(65) Prior Publication Data
US 2019/0386878 A1    Dec. 19, 2019

Related U.S. Application Data

(60) Provisional application No. 62/472,220, filed on Mar. 16, 2017.

(51) Int. Cl.
*H04L 41/0893* (2022.01)
*H04L 41/0813* (2022.01)
(Continued)

(52) U.S. Cl.
CPC ...... *H04L 41/0893* (2013.01); *H04L 41/0813* (2013.01); *H04L 41/5003* (2013.01); *H04W 4/50* (2018.02); *H04W 48/18* (2013.01)

(58) Field of Classification Search
None
See application file for complete search history.

(56) References Cited

U.S. PATENT DOCUMENTS

2016/0330067 A1    11/2016  Liu et al.
2016/0353465 A1    12/2016  Vrzic et al.
(Continued)

FOREIGN PATENT DOCUMENTS

CN    105516312 A    4/2016
CN    106341832 A    1/2017
(Continued)

OTHER PUBLICATIONS

International Patent Office—International Search Report and Written Opinion mailed May 25, 2018, from International Application No. PCT/US2018/022445, 17 pages.
(Continued)

*Primary Examiner* — Rebecca E Song
(74) *Attorney, Agent, or Firm* — Sterne, Kessler, Goldstein & Fox P.L.L.C.

(57) ABSTRACT

An apparatus for self-optimization of a Network Slice Instance, NSI, comprising network slice related management functions is provided. The apparatus can include a Network Slice Management Function, NSMF, operable to monitor a performance of a Network Slice Instance in use, and evaluate whether the Network Slice Instance meets a received set of Network Slice requirements, wherein the received set of Network Slice requirements are received from a Service Management Function, SMF, and/or an Operator's target for performance of the Network Slice Instance. The apparatus can also include a Network Slice Subnet Management Function, in communication with the Network Slice Management Function, and operable to modify a Network Slice SubNet Instance, NSSI, for use in the Network Slice Instance in use in order to meet the received Network Slice requirements.

20 Claims, 4 Drawing Sheets

(51) Int. Cl.
  *H04L 41/5003* (2022.01)
  *H04W 4/50* (2018.01)
  *H04W 48/18* (2009.01)

(56) References Cited

U.S. PATENT DOCUMENTS

| | | | |
|---|---|---|---|
| 2019/0260690 A1* | 8/2019 | Sun | H04L 41/0806 |
| 2019/0327149 A1* | 10/2019 | Sun | H04L 41/0895 |
| 2019/0327317 A1* | 10/2019 | Lu | H04L 67/32 |
| 2019/0349792 A1* | 11/2019 | Xu | H04L 41/042 |

FOREIGN PATENT DOCUMENTS

| | | | |
|---|---|---|---|
| CN | 106412905 A | 2/2017 | |
| EP | 3089505 A1 * | 11/2016 | H04W 24/04 |
| WO | 2016/192636 A1 | 12/2016 | |
| WO | 2017/032280 A1 | 3/2017 | |
| WO | WO-2018082502 A1 * | 5/2018 | G06F 9/45558 |

OTHER PUBLICATIONS

3GPP, "Technical Specification Group Services and System Aspects; Telecommunication management; Study on management and orchestration of network slicing for next generation network (Release 14)," 3GPP TR 28.801 V1.0.0 (Mar. 2017), Lte Advanced Pro, 52 pages.

5G Americas, "Network Slicing for 5G Networks & Services," 5G Americas White Paper- Network Slicing for 5G and Beyond, November 221, 016, 35 pages.

IEEE 802.11-2007; "Information technology—Telecommunications and information exchange between systems—Local and metropolitan area networks—Specific requirements," Part 11: Wireless LAN Medium Access Control (MAC) and Physical Layer (PHY) Specifications; New York, NY; Jun. 12, 2007; 1184 pages.

* cited by examiner

SUPPORTING SON FUNCTIONS ON NETWORK SLICE INSTANCES

CROSS REFERENCE TO RELATED APPLICATION

The present application is a national phase entry under 35 U.S.C. § 371 of International Application No. PCT/US2018/022445, filed Mar. 14, 2018, entitled "SUPPORTING SON FUNCTIONS ON NETWORK SLICE INSTANCES," which claims priority to U.S. Provisional Patent Application No. 62/472,220, filed Mar. 16, 2017, entitled "SUPPORTING SON FUNCTIONS ON NETWORK SLICE INSTANCES," the disclosures of which are hereby incorporated by reference.

BACKGROUND

Various embodiments generally may relate to the field of wireless communications.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

The present disclosure is directed towards solutions for automation of management and orchestration of network slice instances, in particular the so-called SON (Self-Organizing Network) concept that was introduced in the 3GPP draft TR 28.801, "Study on management and orchestration of network slicing for next generation network" version V1.0.0 (March 2017).

The herein disclosed Self-Organizing Network mechanisms bring automation into operation, management and orchestration of network slicing, so it will significantly improve the efficiency and dramatically save the cost.

Embodiments herein relate to methods and apparatuses for self-creation, self-configuration, self-optimization and self-healing for NSIs (Network Slice Instances).

Figure 1:
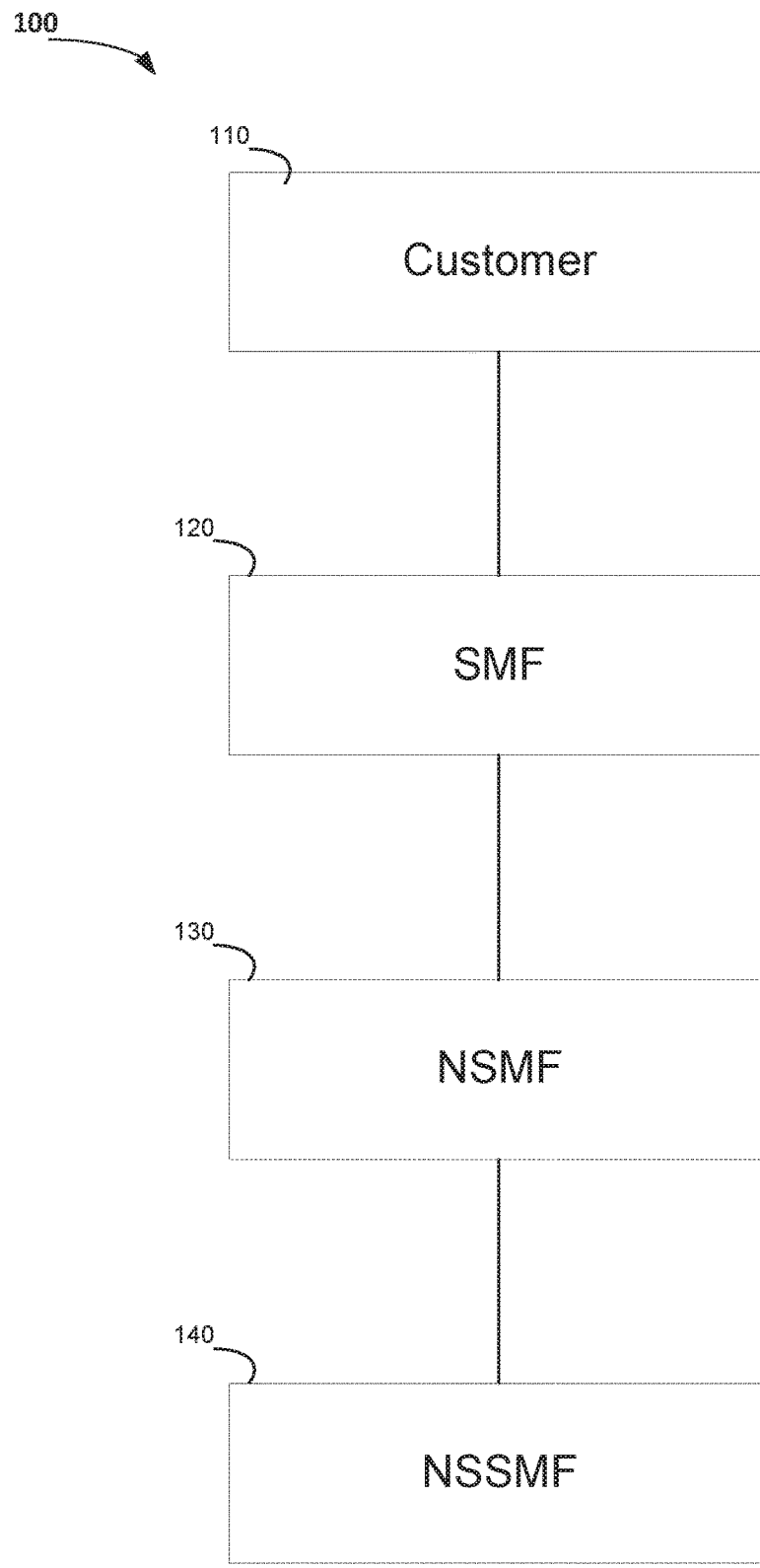
FIG. 1 shows a network slice management framework.

The network slice management framework is as shown in FIG. 1, and the disclosed Self-Organizing Network mechanism needs to be supported by the functions within the management framework. The functions within the management framework 100 disclosed in FIG. 1, which are together operable to manage Network Slice Instances, include a Customer 110, a function managing the communication service (e.g., Service Management Function, (SMF), 120, where the term 'Service Management Function' is used to demonstrate how the functions in this disclosure operate. This is to say, other terms for this function may be used in some implementations), a Network Slice Management Function, NSMF, 130, and a Network Slice SubNet Management Function, NSSMF, 140.

There now follows a detailed description of the operation of these logical management functions.

The Service Management Function 120 is responsible for translating the service related requirement(s) to Network Slice related requirements, and communicate with the Network Slice Management Function 130. The Network Slice Management Function 130 is responsible for management and orchestration of the Network Slice Instance(s), derive Network Slice SubNet related requirements from Network Slice related requirements, and communicate with the Network Slice Subnet Management Function 140 and Service Management Function 120. The Network Slice Subnet Management Function 140 is responsible for management and orchestration of the Network Slice SubNet Instance(s), and communicate with the Network Slice Management Function 130. The Customer 110 can be a third party service provider, or the Operator itself. The Service Management Function 120 receives the service requirements from the Customer 110, and manages the services provided by the Operator. Note, the service can be the 3GPP service running on the Network Slice Instance(s). The Service Management Function 120 converts the service requirements to the Network Slice requirements (such as network type, network capacity, QoS requirements, etc.) and provides them to the Network Slice Management Function 130. The Network Slice Management Function 130 manages the Network Slice Instance(s) based on the Network Slice requirements received from the Service Management Function 120. The Network Slice SubNet Management Function 140 manages the Network Slice SubNet Instance(s) based on the Network Slice SubNet requirements received from the Network Slice Management Function 130.

There now follows a number of example use cases for network slice management automation according to the present disclosure. In particular, the present disclosure provides network slice management automation solutions for: Self-Creation of a Network Slice Instance; Self-Reconfiguration of a Network Slice Instance; Self-Optimization of a Network Slice Instance; and Self-Healing of a Network Slice Instance.

Self-Creation of a Network Slice Instance. Pre-conditions: Customer 110 has provided the service requirements to Service Management Function, SMF, 120. Description: to improve the efficiency and save the cost for operating the network slices, it is desired to have an automated Network Slice Instance creation solution for the Operator; to enable the automated Network Slice Instance creation (a.k.a., Network Slice Instance self-creation), the network slice related management functions need to respectively support the following to build up the end to end automation: Service Management Function 120 generates the network slice requirements based on the service requirements received from Customer 110, and sends to the Network Slice Management Function 130. The Service Management Function 120 may also be called a Communication Service Management Function, CSMF; Network Slice Management Function, NSMF, 130 upon receipt of the network slice requirements, decides whether a new Network Slice Instance needs to be created. If a new Network Slice Instance is needed, the Network Slice Management Function 130: Generates the Network Slice Template; Generates the Network Slice Subnet requirements, and sends the Network Slice SubNet requirements to the Network Slice Subnet Management Function, NSSMF, 140. The Network Slice Subnet requirement may be for creation of a new Network Slice Subnet Instance, NSSI, or for reuse and modification of an existing Network Slice Subnet Instance. A policy may be pre-configured for the Network Slice Management Function 130 to facilitate the Network Slice Instance self-creation: Network Slice Subnet Management Function 140, upon receipt of the Network Slice SubNet requirements: creates the Network Slice Subnet Instance for this Network Slice Instance, if a new Network Slice Subnet Instance is required; Or modifies the existing Network Slice Subnet Instance, if needed; Instantiates the virtualized constituent Network Functions for the new or modified Network Slice Subnet Instance, if needed; Configures the constituent Network Functions to support the Network Slice Instance; Sends an alert to the Network Slice Management Function 130 if the physical constituent Network Function has not yet been deployed. Human intervention should be allowed during the steps described above. Post-conditions: The Network Slice Instance has been self-created (i.e. created automatically).

Self-Reconfiguration of a Network Slice Instance. Pre-conditions: The Network Slice Instance already exists. Description: When the service requirements are changed by the Customer 110, it is desirable that the Network Slice Instance can be reconfigured automatically. To enable the automated Network Slice Instance re-configuration (a.k.a., Network Slice Instance self-reconfiguration), the network slice related management functions need to respectively support the following: the Service Management Function 120 updates the network slice requirements based on the change of service requirements received from the Customer 110, and sends the updated requirements to the Network Slice Management Function 130; the Network Slice Management Function 130, upon receipt of the updated network slice requirements (Updates the Network Slice Template if needed; Updates the Network Slice Subnet requirements, and sends the updated Network Slice SubNet requirements to the Network Slice Subnet Management Function 140; Generates new Network Slice Subnet requirements if a new Network Slice Subnet Instance needs to be created. A policy may be pre-configured to the Network Slice Management Function 130 to facilitate the network slice re-configuration. The Network Slice Subnet Management Function 140, upon receipt of the updated or new Network Slice SubNet requirements: modifies the Network Slice Subnet Instance; creates the new Network Slice Subnet Instance, if required. Human intervention should be allowed during the steps described above. Post-conditions: The Network Slice Instance has been self-reconfigured (i.e. reconfigured automatically). Self-Optimization of a Network Slice Instance. Pre-conditions: The Network Slice Instance already exists. Description: The Network Slice Management Function 130 monitors the performance of the Network Slice Instance, and evaluates whether the Network Slice Instance meets the Network Slice requirements (received from Service Management Function 120) and Operator's target. The Network Slice Management Function 130 may trigger the self-optimization for the Network Slice Instance based on analytics of the performance measurements. The Network Slice Instance self-optimization may include (but not be limited to) the following: modification of the Network Slice Template; modification of Network Slice Subnet requirements, and sending to the Network Slice Subnet Management Function 140; Generation of new Network Slice Subnet requirements if a new Network Slice Subnet Instance needs to be created. The Network Slice Subnet Management Function 140, upon receipt of the updated or new Network Slice SubNet requirements: modifies the Network Slice Subnet Instance; creates the new Network Slice Subnet Instance, if required; the Network Slice Subnet Management Function 140 monitors the performance of the Network Slice Subnet Instance, and may automatically optimize the Network Slice Subnet Instance (a.k.a., Network Slice Subnet Instance self-optimization) without receiving the updated Network Slice Subnet requirements. The Network Slice Subnet Management Function 140 needs to support the coordination for the Network Slice Subnet Instance optimization triggered by the Network Slice Management Function 130, and Network Slice Subnet Instance self-optimization triggered by the Network Slice Subnet Management Function 140. Human intervention should be allowed during the steps described above. Post-conditions: The Network Slice Instance has been self-optimized (i.e. optimized automatically).

Self-Healing of a Network Slice Instance. Pre-conditions: the Network Slice Instance already exists. Description: The Network Slice Management Function 130 monitors the alarms of the Network Slice Instance, and if necessary automatically heals the Network Slice Instance. The Network Slice Instance self-healing approach may include (but not be limited to) the following: adding a new Network Function to compensate the faulty Network Function for the Network Slice Instance; configuring another Network Function to compensate the faulty Network Function for the Network Slice Instance; applying recovery actions on the faulty Network Function, if possible. The Network Slice Management Function 130 modifies or creates new Network Slice Subnet requirements for the self-healing purpose to the Network Slice Subnet Management Function 140. The Network Slice Subnet Management Function 140, upon receipt of the modified or new Network Slice SubNet requirements compensates the faulty Network Function by: modifying the Network Slice Subnet Instance or creating the new Network Slice Subnet Instance, if required; the Network Slice Subnet Management Function 140 may also perform the recovery action on the faulty Network Function, if requested by the Network Slice Management Function 130. The Network Slice Subnet Management Function 140 monitors the alarms of the Network Slice Subnet Instance, and may automatically heal the Network Slice Subnet Instance (a.k.a., Network Slice Subnet Instance self-healing) without receiving the request from the Network Slice Management Function 130. The Network Slice Subnet Management Function 140 needs to support the coordination for the Network Slice Subnet Instance healing triggered by the Network Slice Management Function 130, and Network Slice Subnet Instance self-healing triggered by the Network Slice Subnet Management Function 140. Human intervention should be allowed during the steps described above. Post-conditions: The Network Slice Instance has been self-healed.

The document 3GPP Draft TR 28.801, "Study on management and orchestration of network slicing for next generation network" version V1.0.0 (March 2017), is hereby incorporated by reference, in its entirety.

Figure 2:
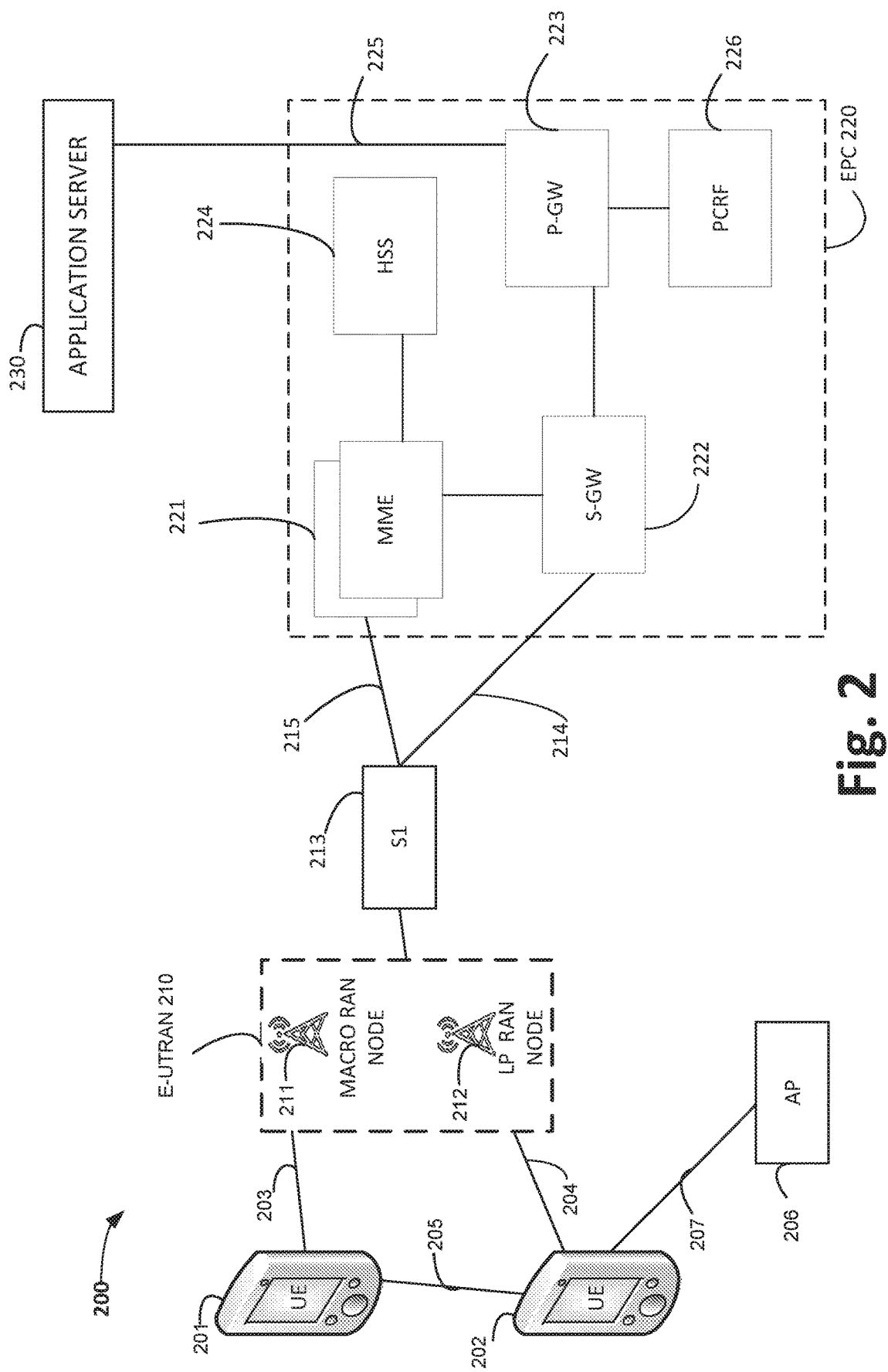
FIG. 2 illustrates an architecture of a system 200 of a network in accordance with some embodiments.

FIG. 2 illustrates an architecture of a system 200 of a network in accordance with some embodiments. The system 200 is shown to include a user equipment (UE) 201 and a UE 202. The UEs 201 and 202 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 201 and 202 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 201 and 202 may be configured to connect, e.g., communicatively couple, with a radio access network (RAN)—in this embodiment, an Evolved Universal Mobile Telecommunications System (UMTS) Terrestrial Radio Access Network (E-UTRAN) 210. The UEs 201 and 202 utilize connections 203 and 204, respectively, each of which comprises a physical communications interface or layer (discussed in further detail below); in this example, the connections 203 and 204 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 201 and 202 may further directly exchange communication data via a ProSe interface 205. The ProSe interface 205 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 202 is shown to be configured to access an access point (AP) 206 via connection 207. The connection 207 can comprise a local wireless connection, such as a connection consistent with any IEEE 802.11 protocol, wherein the AP 206 would comprise a wireless fidelity (WiFi®) router. In this example, the AP 206 is shown to be connected to the Internet without connecting to the core network of the wireless system (described in further detail below).

The E-UTRAN 210 can include one or more access nodes that enable the connections 203 and 204. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The E-UTRAN 210 may include one or more RAN nodes for providing macrocells, e.g., macro RAN node 211, and one or more RAN nodes for providing femtocells or picocells (e.g., cells having smaller coverage areas, smaller user capacity, or higher bandwidth compared to macrocells), e.g., low power (LP) RAN node 212.

Any of the RAN nodes 211 and 212 can terminate the air interface protocol and can be the first point of contact for the UEs 201 and 202. In some embodiments, any of the RAN nodes 211 and 212 can fulfill various logical functions for the E-UTRAN 210 including, but not limited to, radio network controller (RNC) functions such as radio bearer management, uplink and downlink dynamic radio resource management and data packet scheduling, and mobility management.

In accordance with some embodiments, the UEs 201 and 202 can be configured to communicate using Orthogonal Frequency-Division Multiplexing (OFDM) communication signals with each other or with any of the RAN nodes 211 and 212 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 211 and 212 to the UEs 201 and 202, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 201 and 202. The physical downlink control channel (PDCCH) may carry information about the transport format and resource allocations related to the PDSCH channel, among other things. It may also inform the UEs 201 and 202 about the transport format, resource allocation, and H-ARQ (Hybrid Automatic Repeat Request) information related to the uplink shared channel. Typically, downlink scheduling (assigning control and shared channel resource blocks to the UE 202 within a cell) may be performed at any of the RAN nodes 211 and 212 based on channel quality information fed back from any of the UEs 201 and 202. The downlink resource assignment information may be sent on the PDCCH used for (e.g., assigned to) each of the UEs 201 and 202.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The E-UTRAN 210 is shown to be communicatively coupled to a core network—in this embodiment, an Evolved Packet Core (EPC) network 220 via an S1 interface 213. In this embodiment the S1 interface 213 is split into two parts: the S1-U interface 214, which carries traffic data between the RAN nodes 211 and 212 and the serving gateway (S-GW) 222, and the S1-mobility management entity (MME) interface 215, which is a signaling interface between the RAN nodes 211 and 212 and MMEs 221.

In this embodiment, the EPC network 220 comprises the MMEs 221, the S-GW 222, the Packet Data Network (PDN) Gateway (P-GW) 223, and a home subscriber server (HSS) 224. The MMEs 221 may be similar in function to the control plane of legacy Serving General Packet Radio Service (GPRS) Support Nodes (SGSN). The MMEs 221 may manage mobility aspects in access such as gateway selection and tracking area list management. The HSS 224 may comprise a database for network users, including subscription-related information to support the network entities' handling of communication sessions. The EPC network 220 may comprise one or several HSSs 224, depending on the number of mobile subscribers, on the capacity of the equipment, on the organization of the network, etc. For example, the HSS 224 can provide support for routing/roaming, authentication, authorization, naming/addressing resolution, location dependencies, etc.

The S-GW 222 may terminate the S1 interface 213 towards the E-UTRAN 210, and routes data packets between the E-UTRAN 210 and the EPC network 220. In addition, the S-GW 222 may be a local mobility anchor point for inter-RAN node handovers and also may provide an anchor for inter-3GPP mobility. Other responsibilities may include lawful intercept, charging, and some policy enforcement.

The P-GW 223 may terminate an SGi interface toward a PDN. The P-GW 223 may route data packets between the EPC network 220 and external networks such as a network including the application server 230 (alternatively referred to as application function (AF)) via an Internet Protocol (IP) interface 225. Generally, the application server 230 may be an element offering applications that use IP bearer resources with the core network (e.g., UMTS Packet Services (PS) domain, LTE PS data services, etc.). In this embodiment, the P-GW 223 is shown to be communicatively coupled to an application server 230 via an IP communications interface 225. The application server 230 can also be configured to support one or more communication services (e.g., Voice-over-Internet Protocol (VoIP) sessions, PTT sessions, group communication sessions, social networking services, etc.) for the UEs 201 and 202 via the EPC network 220.

The P-GW 223 may further be a node for policy enforcement and charging data collection. Policy and Charging Enforcement Function (PCRF) 226 is the policy and charging control element of the EPC network 220. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 226 may be communicatively coupled to the application server 230 via the P-GW 223. The application server 230 may signal the PCRF 226 to indicate a new service flow and select the appropriate Quality of Service (QoS) and charging parameters. The PCRF 226 may provision this rule into a Policy and Charging Enforcement Function (PCEF) (not shown) with the appropriate traffic flow template (TFT) and QoS class of identifier (QCI), which commences the QoS and charging as specified by the application server 230.

Figure 3:
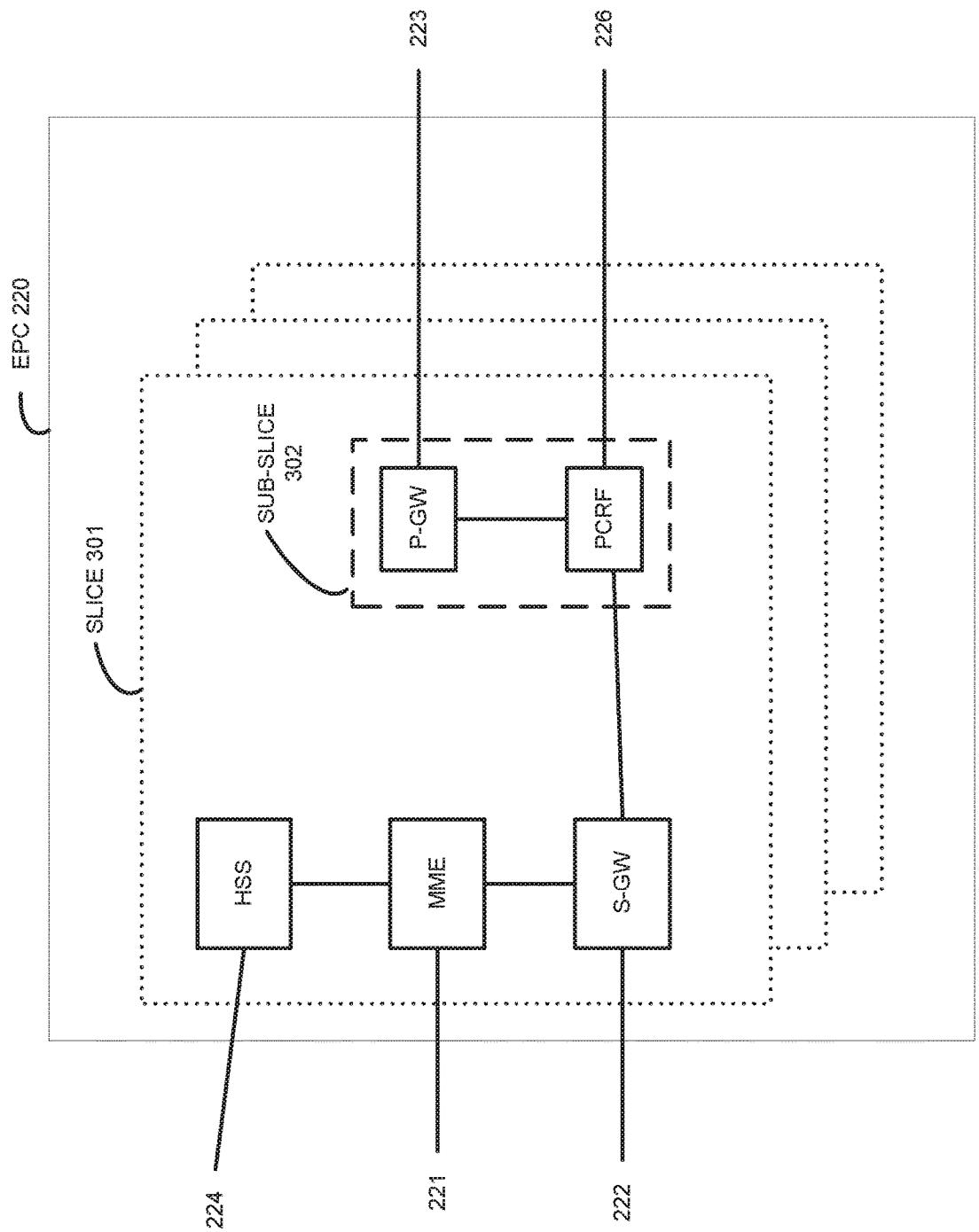
FIG. 3 illustrates components of a core network 300 in accordance with some embodiments.

FIG. 3 illustrates components of a core network in accordance with some embodiments. The components of the EPC 220 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the EPC network 220 may be referred to as a network slice 301. A logical instantiation of a portion of the EPC network 220 may be referred to as a network sub-slice 302 (e.g., the network sub-slice 302 is shown to include the P-GW 223 and the PCRF 226).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 4:
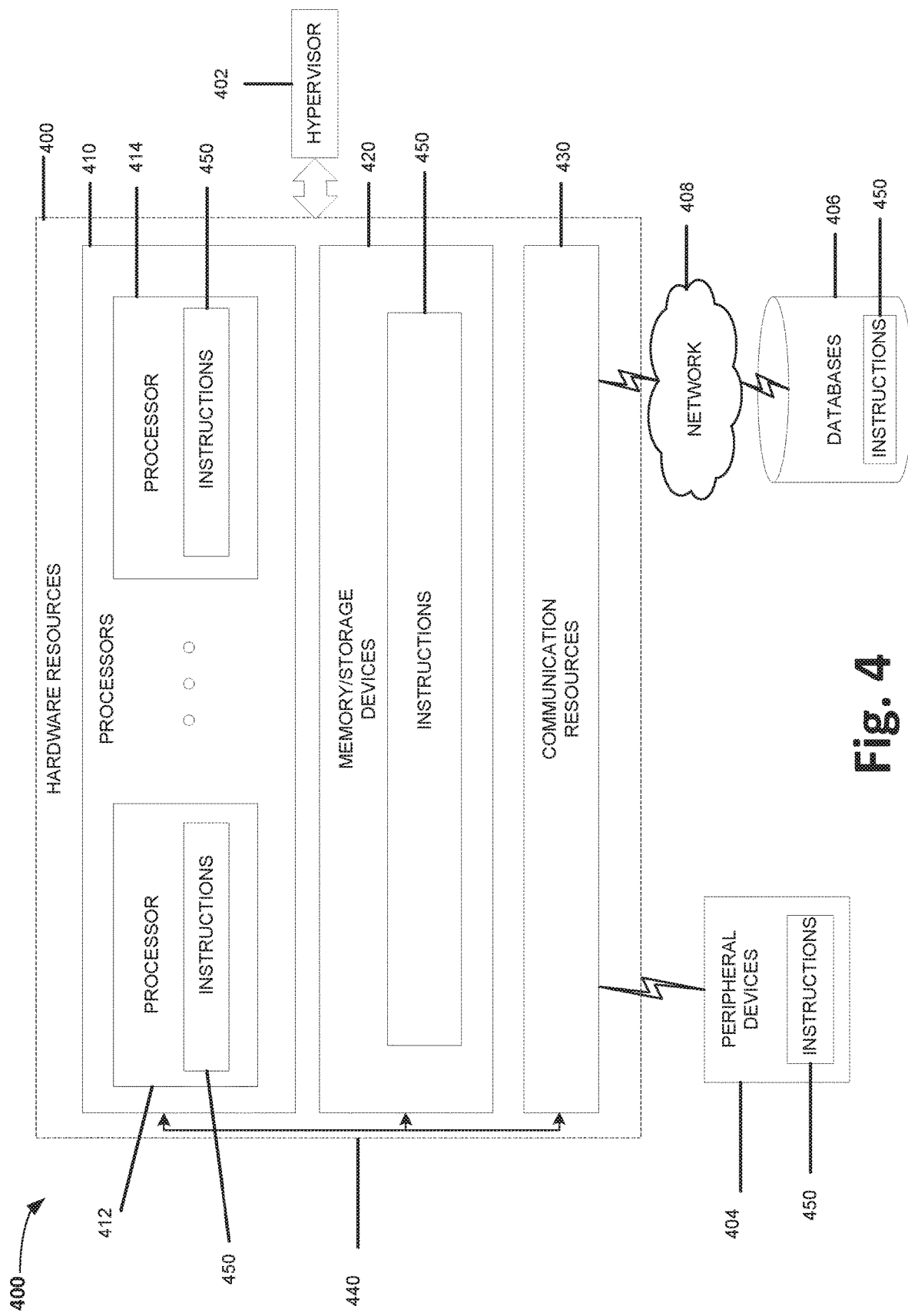
FIG. 4 is a block diagram illustrating components, according to some example embodiments.

FIG. 4 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 4 shows a diagrammatic representation of hardware resources 400 including one or more processors (or processor cores) 410, one or more memory/storage devices 420, and one or more communication resources 430, each of which may be communicatively coupled via a bus 440. For embodiments where node virtualization (e.g., NFV) is utilized, a hypervisor 402 may be executed to provide an execution environment for one or more network slices/sub-slices to utilize the hardware resources 400

The processors 410 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 412 and a processor 414.

The memory/storage devices 420 may include main memory, disk storage, or any suitable combination thereof. The memory/storage devices 420 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 430 may include interconnection or network interface components or other suitable devices to communicate with one or more peripheral devices 404 or one or more databases 406 via a network 408. For example, the communication resources 430 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 450 may comprise software, a program, an application, an applet, an app, or other executable code for causing at least any of the processors 410 to perform any one or more of the methodologies discussed herein. The instructions 450 may reside, completely or partially, within at least one of the processors 410 (e.g., within the processor's cache memory), the memory/storage devices 420, or any suitable combination thereof. Furthermore, any portion of the instructions 450 may be transferred to the hardware resources 400 from any combination of the peripheral devices 404 or the databases 406. Accordingly, the memory of processors 410, the memory/storage devices 420, the peripheral devices 404, and the databases 406 are examples of computer-readable and machine-readable media.

In some embodiments, the electronic device of FIG. 4, or some other component or device of FIG. 2 or 3, may be configured to perform one or more processes, techniques, and/or methods as described herein, or portions thereof.

Example 1 may include a Service Management Function (SMF) 120 supported by one or more processors that is to: receive the service requirements from Customer 110; and send the response to Customer 110 to indicate whether the service requirements are satisfied.

Example 2 may include the subject matter of example 1 and/or some other example herein, wherein the Service Management Function (SMF) 120 supported by one or more processors, upon receipt of the service requirements from Customer 110, is to: generate the network slice requirements; and send the network slice requirements to Network Slice Management Function (NSMF) 130; and receive the result from NSMF 130 about whether the network slice requirements are satisfied.

Example 3 may include a Network Slice Management Function (NSMF) 130 supported by one or more processors that are to: receive the network slice requirements from SMF 120; and send the result to SMF 120 to indicate whether the network slice requirements are satisfied.

Example 4 may include the subject matter of example 3 and/or some other example herein, wherein the Network Slice Management Function (NSMF) 130 supported by one or more processors, upon receipt of network slice requirements from SMF 120, is to: generate the Network Slice Template; and/or modify the Network Slice Template; and/or create the NSI; and/or reconfigure the NSI; and
 generate the Network Slice Subnet requirements; and
 send the Network Slice Subnet requirements to Network Slice Subnet Management Function (NSSMF) 140; and
 receive a result from NSSMF 140 about whether the Network Slice Subnet requirements are satisfied.

Example 5 may include a Network Slice Management Function (NSMF) 130 supported by one or more processors that are to: monitor the performance measurements for an NSI; and perform the following tasks based on the analysis of the performance measurements: modify the Network Slice Template; and optimize the NSI; and generate the Network Slice Subnet requirements; and send the Network Slice Subnet requirements to Network Slice Subnet Management Function (NSSMF) 140; and receive a result from NSSMF 140 about whether the Network Slice Subnet requirements are satisfied.

Example 6 may include a Network Slice Management Function (NSMF) 130 supported by one or more processors that are to:
 monitor the alarms of an NSI; and
 perform the following tasks, based on the alarm information: heal the NSI; and/or generate the Network Slice Subnet requirements; and send the Network Slice Subnet requirements to Network Slice Subnet Management Function (NSSMF) 140; and receive a result from NSSMF 140 about whether the Network Slice Subnet requirements are satisfied.

Example 7 may include the subject matter of examples 2, 3 and 4 and/or some other example herein, wherein the network slice requirements are the new requirements or updated requirements.

Example 8 may include the subject matter of example 6 and/or some other example herein, wherein to heal the NSI, the NSMF 130 is to: add a new Network Function (NF) to compensate the faulty NF for the NSI; configure another NF to compensate the faulty NF for the NSI; and/or apply recovery actions on the faulty NF.

Example 9 may include a Network Slice Subnet Management Function (NSSMF) 140 supported by one or more processors that are to:
 receive the network slice subnet requirements from NSMF 130; and
 send the result to NSMF 130 about whether the network slice subnet requirements are satisfied.

Example 10 may include the subject matter of example 9 and/or some other example herein, wherein the Network Slice Subnet Management Function (NSSMF) 140 supported by one or more processors, upon receipt of network slice subnet requirements from NSMF 130, is to:
 create the NSSI; and/or
 modify the NSSI; and/or
 Instantiates the virtualized constituent NFs for the new or modified NSSI; and/or
 Configures the constituent NFs to support the NSI; and
 Sends an alert to NSMF 130 if the physical constituent NF has not yet been deployed.

Example 11 may include the subject matter of examples 4, 5, 6, 9 and 10 and/or some other example herein, wherein the Network Slice Subnet requirements are for creation of a new Network Slice Subnet Instance (NSSI).

Example 12 may include the method according to examples 4, 5, 6, 9 and 10 and/or some other example herein, wherein the Network Slice Subnet requirements are for modification of a legacy NSSI.

Example 13 may include a Network Slice Subnet Management Function (NSSMF) 140 supported by one or more processors that are to:
monitor the performance measurements for an NSSI; and
perform the following tasks, based on the analysis of the performance measurements: optimize the NSSI; and send the notification to NSMF 130 about the optimization of NSI.

Example 14 may include the subject matter of examples 4, 5, 6, 8, 9, 10 and 13 and/or some other example herein, wherein the Network Slice Subnet Management Function (NSSMF) (140) supported by one or more processors is to:
coordinate the NSSI modification triggered by NSMF (130) and the NSSI optimization triggered by NSSMF (140).

Example 15 may include a Network Slice Subnet Management Function (NSSMF) 140 supported by one or more processors that are to:
monitor the alarms for an NSSI; and
perform the following tasks, based on the alarm information: heal the NSSI; and send the notification to NSMF 130 about the healing of NSSI.

Example 16 may include the subject matter of examples 4, 5, 6, 8, 9, 10 and 15 and/or some other example herein, wherein the Network Slice Subnet Management Function (NSSMF) 140 supported by one or more processors is to: coordinate the NSSI healing triggered by NSMF 130 and by NSSMF 140.

Example 17 may include the subject matter of examples 2, 3, 4, 5, 6, 7 and 8 and/or some other example herein, wherein the Network Slice Management Function (NSMF) 130 supported by one or more processors is to:
receive a policy from Operator for: self-creation of NSI; and/or; self-reconfiguration of NSI; and/or self-optimization of NSI; and/or self-healing of NSI.
provide the result to the Operator about whether the policy is fulfilled.

Example 18 may include an apparatus comprising means to perform one or more elements of a method described in or related to any of examples 1-17, or any other method or process described herein.

Example 19 may include one or more non-transitory computer-readable media comprising instructions to cause an electronic device, upon execution of the instructions by one or more processors of the electronic device, to perform one or more elements of a method described in or related to any of examples 1-17, or any other method or process described herein.

Example 20 may include an apparatus comprising logic, modules, and/or circuitry to perform one or more elements of a method described in or related to any of examples 1-17, or any other method or process described herein.

Example 21 may include a method, technique, or process as described in or related to any of examples 1-17, or portions or parts thereof.

Example 22 may include an apparatus comprising: one or more processors and one or more computer readable media comprising instructions that, when executed by the one or more processors, cause the one or more processors to perform the method, techniques, or process as described in or related to any of examples 1-17, or portions thereof.

Example 23 may include a method of communicating in a wireless network as shown and described herein. Example 24 may include a system for providing wireless communication as shown and described herein. Example 25 may include a device for providing wireless communication as shown and described herein.

Examples provide an apparatus for self-optimization of a Network Slice Instance, NSI, comprising network slice related management functions comprising one or more of: a Network Slice Management Function, NSMF, operable to monitor a performance of a Network Slice Instance in use, and evaluate whether the Network Slice Instance meets a received set of Network Slice requirements, wherein the received set of Network Slice requirements are received from a Service Management Function, SMF, and/or an Operator's target for performance of the Network Slice Instance; and a Network Slice Subnet Management Function, in communication with the Network Slice Management Function, and operable to modify a Network Slice SubNet Instance, NSSI, for use in the Network Slice Instance in use in order to meet the received Network Slice requirements.

In some examples, the Network Slice Management Function is operable to trigger the self-optimization for the Network Slice Instance in use, based on analytics of performance measurements.

In some examples, the Network Slice Management Function is operable to: modify the Network Slice Template; and/or modify the Network Slice Subnet requirements, and send the updated Network Slice SubNet requirements to the Network Slice Subnet Management Function; and/or generate new Network Slice SubNet requirements if a new Network Slice SubNet Instance needs to be created.

In some examples, a policy may be pre-configured for the Network Slice Management Function to facilitate network slice re-configuration.

In some examples, the Network Slice Subnet Management Function, upon receipt of the updated or new Network Slice SubNet requirements, is operable to: modify an existing Network Slice Subnet Instance; and/or create a new Network Slice Subnet Instance for a new Network Slice Instance, if a new Network Slice Subnet Instance is required.

In some examples, the Network Slice Subnet Management Function is further operable to: instantiate a virtualized constituent Network Function(s) for the new Network Slice Subnet Instance, or the modified existing Network Slice Subnet Instance, if needed; configure the virtualized constituent Network Function(s) to support the new or modified Network Slice Instance.

In some examples, the Network Slice Subnet Management Function is further operable to: send an alert to the Network Slice Management Function if a physical constituent Network Function has not yet been deployed.

In some examples, the Network Slice Subnet Management Function is further operable to: monitor the performance of an Network Slice Subnet Instance and self-optimize the Network Slice Subnet Instance without receiving the updated Network Slice SubNet requirements; and/or perform recovery action on a faulty Network Function, if requested by the Network Slice Management Function.

In some examples, the Network Slice Subnet Management Function is further operable to support a coordination for a Network Slice Subnet Instance optimization triggered by the Network Slice Management Function or the Network Slice SubNet Management Function.

In some examples, the Network Slice Subnet Management Function is further operable to: monitor alarms of the Network Slice Instance in use; and heal the Network Slice Instance in use if an alarm is activated.

In some examples, the Network Slice Management Function is further operable to: add a new Network Function to compensate for a faulty Network Function of the Network Slice Instance in use; and/or configure another Network Function to compensate for a faulty Network Function of the Network Slice Instance in use; and/or apply recovery actions for the faulty Network Function of the Network Slice Instance in use.

In some examples, the Network Slice Management Function is further operable to: modify existing or create new Network Slice SubNet requirements for self-healing purposes; and send the modified or newly created Network Slice SubNet requirements to the Network Slice SubNet Management Function.

In some examples, the self-optimization of the Network Slice Instance comprises self-healing, self-reconfiguration and/or new creation of a Network Slice Instance.

Examples provide an apparatus for self-creation of a new Network Slice Instance, NSI, comprising network slice related management functions comprising one or more of: a function managing the communication service (e.g., Service Management Function, SMF, 120); a Network Slice Management Function, NSMF, 130 in communication with the Service Management Function 120 and operable, upon receipt of network slice requirements from the Service Management Function 120, to decide whether a new Network Slice Instance needs to be created; and a Network Slice Subnet Management Function 140, in communication with the Network Slice Management Function 130, and operable to generate a Network Slice SubNet Instance, NSSI, for use in the new Network Slice Instance.

In some examples the Service Management Function, SMF 120 is operable to: generate network slice requirements for the new Network Slice Instance based on service requirements received from a Customer 110; and send the generated network slice requirements to the Network Slice Management Function 130.

In some examples, if a new Network Slice Instance is needed, the Network Slice Management Function 130 is operable to: generate a new Network Slice Template; and generate the Network Slice Subnet requirements, and send the Network Slice SubNet requirements to the Network Slice Subnet Management Function 140.

In some examples the Network Slice Subnet requirements are for creation of a new Network Slice Subnet Instance, or for reuse and modification of an existing Network Slice Subnet Instance.

In some examples a policy may be pre-configured for the Network Slice Management Function 130 to facilitate the Network Slice Instance self-creation.

In some examples the Network Slice Subnet Management Function 140, upon receipt of the new Network Slice SubNet requirements, is operable to: create a new Network Slice Subnet Instance for the new Network Slice Instance, if a new Network Slice Subnet Instance is required; or modify an existing Network Slice Subnet Instance, if needed.

In some examples the Network Slice Subnet Management Function 140 is further operable to: instantiate a virtualized constituent Network Function(s) for the new Network Slice Subnet Instance, or the modified existing Network Slice Subnet Instance, if needed; and configure the virtualized constituent Network Function(s) to support the Network Slice Instance.

In some examples the Network Slice Subnet Management Function 140 is further operable to send an alert to the Network Slice Management Function 130 if a physical constituent Network Function has not yet been deployed.

Examples provide an apparatus for self-reconfiguration of a new Network Slice Instance, NSI, comprising network slice related management functions comprising one or more of: a Service Management Function, SMF, 120; a Network Slice Management Function, NSMF, 130, in communication with the Service Management Function 120 and operable, upon a change of network slice requirements from the Service Management Function 120, to automatically modify a Network Slice Instance in use; and a Network Slice Subnet Management Function 140, in communication with the Network Slice Management Function 130, and operable to modify a Network Slice SubNet Instance, NSSI, for use in the Network Slice Instance in use.

In some examples, the Service Management Function, SMF, 120, is operable to: modify network slice requirements for the modified Network Slice Instance based on a change of service requirements received from a Customer 110; and send the updated network slice requirements to the Network Slice Management Function 130.

In some examples, upon receipt of updated network slice requirements, the Network Slice Management Function 130 is operable to: modify the Network Slice Template; and/or update the Network Slice Subnet requirements, and send the updated Network Slice SubNet requirements to the Network Slice Subnet Management Function 140; and/or generate new Network Slice SubNet requirements if a new Network Slice SubNet Instance needs to be created.

In some examples a policy may be pre-configured for the Network Slice Management Function 130 to facilitate network slice re-configuration.

In some examples the Network Slice Subnet Management Function 140, upon receipt of the updated or new Network Slice SubNet requirements, is operable to: modify an existing Network Slice Subnet Instance; and/or create a new Network Slice Subnet Instance for a new Network Slice Instance, if a new Network Slice Subnet Instance is required.

In some examples the Network Slice Subnet Management Function 140 is further operable to: instantiate a virtualized constituent Network Function(s) for the new Network Slice Subnet Instance, or the modified existing Network Slice Subnet Instance, if needed; configure the virtualized constituent Network Function(s) to support the new or modified Network Slice Instance.

In some examples the Network Slice Subnet Management Function 140 is further operable to: send an alert to the Network Slice Management Function 130 if a physical constituent Network Function has not yet been deployed.

Examples also provide one or more non-transitory computer-readable media comprising instructions to cause an electronic device, upon execution of the instructions by one or more processors of the electronic device, to perform one or more elements of a method for self-creation of a new Network Slice Instance, NSI, comprising: managing the communication service (e.g., by a Service Management Function, SMF, 120); deciding, upon receipt of network slice requirements from the Service Management Function 120, whether a new Network Slice Instance needs to be created; and generating a Network Slice SubNet Instance, NSSI, for use in the new Network Slice Instance.

In some examples the method further comprises: generating network slice requirements for the new Network Slice Instance based on service requirements received from a Customer 110; and sending the generated network slice requirements to the Network Slice Management Function 130.

In some examples the method further comprises: generating a new Network Slice Template; and generating the Network Slice Subnet requirements, and sending the Network Slice SubNet requirements to the Network Slice Subnet Management Function 140.

In some examples the Network Slice Subnet requirements are for creation of a new Network Slice Subnet Instance, or for reuse and modification of an existing Network Slice Subnet Instance.

In some examples the method further comprises be pre-configuring a policy for the Network Slice Management Function 130 to facilitate the Network Slice Instance self-creation.

In some examples the method further comprises, upon receipt of the new Network Slice SubNet requirements: creating a new Network Slice Subnet Instance for the new Network Slice Instance, if a new Network Slice Subnet Instance is required; or modifying an existing Network Slice Subnet Instance, if needed.

In some examples the method further comprises: instantiating a virtualized constituent Network Function(s) for the new Network Slice Subnet Instance, or the modified existing Network Slice Subnet Instance, if needed; and configuring the virtualized constituent Network Function(s) to support the Network Slice Instance.

In some examples the method further comprises sending an alert to the Network Slice Management Function 130 if a physical constituent Network Function has not yet been deployed.

Examples also provide one or more non-transitory computer-readable media comprising instructions to cause an electronic device, upon execution of the instructions by one or more processors of the electronic device, to perform one or more elements of a method for self-reconfiguration of a new Network Slice Instance, NSI, comprising, upon a change of network requirements from the Service Management Function 120: automatically modifying a Network Slice Instance in use; and modifying a Network Slice SubNet Instance, NSSI, for use in the Network Slice Instance in use.

In some examples the method further comprises: modifying network slice requirements for the modified Network Slice Instance based on a change of service requirements received from a Customer 110; and sending the updated network slice requirements to the Network Slice Management Function 130.

In some examples the method further comprises, upon receipt of updated network slice requirements: modifying the Network Slice Template; and/or updating the Network Slice Subnet requirements, and sending the updated Network Slice SubNet requirements to the Network Slice Subnet Management Function 140; and/or generating new Network Slice SubNet requirements if a new Network Slice SubNet Instance needs to be created.

In some examples the method further comprises pre-configuring a policy for the Network Slice Management Function 130 to facilitate network slice re-configuration.

In some examples the method further comprises, upon receipt of the updated or new Network Slice SubNet requirements: modifying an existing Network Slice Subnet Instance; and/or creating a new Network Slice Subnet Instance for a new Network Slice Instance, if a new Network Slice Subnet Instance is required.

In some examples the method further comprises: instantiating a virtualized constituent Network Function(s) for the new Network Slice Subnet Instance, or the modified existing Network Slice Subnet Instance, if needed; and configuring the virtualized constituent Network Function(s) to support the new or modified Network Slice Instance.

In some examples the method further comprises sending an alert to the Network Slice Management Function 130 if a physical constituent Network Function has not yet been deployed.

Examples also provide one or more non-transitory computer-readable media comprising instructions to cause an electronic device, upon execution of the instructions by one or more processors of the electronic device, to perform one or more elements of a method for self-optimization of a Network Slice Instance, NSI, comprising: monitoring a performance of a Network Slice Instance in use; evaluating whether the Network Slice Instance meets a received set of Network Slice requirements, wherein the received set of Network Slice requirements are received from a Service Management Function, SMF, 120, and/or an Operator's target for performance of the Network Slice Instance; and modifying a Network Slice SubNet Instance, NSSI, for use in the Network Slice Instance in use in order to meet the received Network Slice requirements.

In some examples the method further comprises triggering the self-optimization for the Network Slice Instance in use, based on analytics of performance measurements.

In some examples the method further comprises: modifying the Network Slice Template; and/or modifying the Network Slice Subnet requirements, and sending the updated Network Slice SubNet requirements to a Network Slice Subnet Management Function 140; and/or generating new Network Slice SubNet requirements if a new Network Slice SubNet Instance needs to be created.

In some examples the method further comprises pre-configuring a policy for a Network Slice Management Function 130 to facilitate network slice re-configuration.

In some examples the method further comprises, upon receipt of the updated or new Network Slice NubNet requirements: modifying an existing Network Slice Subnet Instance; and/or creating a new Network Slice Subnet Instance for a new Network Slice Instance, if a new Network Slice Subnet Instance is required.

In some examples the method further comprises: instantiating a virtualized constituent Network Function(s) for the new Network Slice Subnet Instance, or the modified existing Network Slice Subnet Instance, if needed; and configuring the virtualized constituent Network Function(s) to support the new or modified Network Slice Instance.

In some examples the method further comprises sending an alert to the Network Slice Management Function 130 if a physical constituent Network Function has not yet been deployed.

In some examples the method further comprises: monitoring the performance of an Network Slice Subnet Instance and self-optimizing the Network Slice Subnet Instance without receiving the updated Network Slice SubNet requirements; and/or performing recovery action on a faulty Network Function, if requested by the Network Slice Management Function 130.

In some examples the method further comprises supporting a coordination for a Network Slice Subnet Instance optimization triggered by the Network Slice Management Function 130 or the Network Slice SubNet Management Function 140.

In some examples the method further comprises: monitoring alarms of the Network Slice Instance in use; and healing the Network Slice Instance in use if an alarm is activated.

In some examples the method further comprises: adding a new Network Function to compensate for a faulty Network Function of the Network Slice Instance in use; and/or configuring another Network Function to compensate for a faulty Network Function of the Network Slice Instance in use; and/or applying recovery actions for the faulty Network Function of the Network Slice Instance in use.

In some examples the method further comprises: modifying existing or creating new Network Slice SubNet requirements for self-healing purposes; and sending the modified or newly created Network Slice SubNet requirements to the Network Slice SubNet Management Function 140.

In some examples the self-optimization of the Network Slice Instance comprises self-healing, self-reconfiguration and/or new creation of a Network Slice Instance.

In some examples, the self-organization/automatic organization comprises self-organization/automatic organization of Network Slice SubNet Instances. Examples also provide methods corresponding to the above-described non-transitory computer-readable media based methods.

In the foregoing, the interface names, and the names of the entities involved, are only exemplary and are descriptive of the logical entities involved in the communications over the respectively named interfaces.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The invention claimed is:

1. An apparatus for self-optimization of a Network Slice Instance comprising network slice related management functions, the apparatus comprising:
   circuitry to implement a Network Slice Management Function to monitor a performance of the Network Slice Instance in use, evaluate whether the Network Slice Instance meets a received set of Network Slice requirements, and trigger the self-optimization for the Network Slice Instance based at least in part on the monitored performance of the Network Slice Instance, wherein the received set of Network Slice requirements are received from a Service Management Function or an Operator's target for performance of the Network Slice Instance, and wherein the Network Slice Management Function is implemented to modify one or more Network Slice SubNet requirements in response to triggering the self-optimization and based at least in part on the monitored performance of the Network Slice Instance; and
   circuitry to implement a Network Slice Subnet Management Function, in communication with the Network Slice Management Function, to modify a Network Slice SubNet Instance based at least in part on the modified one or more Network Slice SubNet requirements for use in the Network Slice Instance in use in order to meet the received set of Network Slice requirements.

2. The apparatus of claim 1, wherein the Network Slice Management Function is further to:
   send the updated Network Slice SubNet requirements to the Network Slice Subnet Management Function circuitry; or
   generate new Network Slice SubNet requirements if a new Network Slice SubNet Instance needs to be created.

3. The apparatus of claim 1, wherein the Network Slice Management Function is to be pre-configured with a policy to facilitate network slice re-configuration.

4. The apparatus of claim 2, wherein the Network Slice Subnet Management Function, upon receipt of the updated or new Network Slice SubNet requirements, is operable to:
   modify an existing Network Slice Subnet Instance; or
   create a new Network Slice Subnet Instance for a new Network Slice Instance, if a new Network Slice Subnet Instance is required.

5. The apparatus of claim 4, wherein the Network Slice Subnet Management Function is further to:
   instantiate a virtualized constituent Network Function(s) for the new Network Slice Subnet Instance, or the modified existing Network Slice Subnet Instance, if needed;
   configure the virtualized constituent Network Function(s) to support the new or modified Network Slice Instance.

6. The apparatus of claim 1, wherein the Network Slice Subnet Management Function is further to:
   send an alert to the Network Slice Management Function if a physical constituent Network Function has not yet been deployed.

7. The apparatus of claim 1, wherein the Network Slice Subnet Management Function is further to:
   perform a recovery action on a faulty Network Function, if requested by the Network Slice Management Function.

8. The apparatus of claim 1, wherein the Network Slice Subnet Management Function is further to support a coordination for a Network Slice Subnet Instance optimization triggered by the Network Slice Management Function or the Network Slice SubNet Management Function.

9. The apparatus of claim 1, wherein the Network Slice Subnet Management Function is further to:
   monitor alarms of the Network Slice Instance in use; and
   heal the Network Slice Instance in use if an alarm is activated.

10. The apparatus of claim 9, wherein the Network Slice Management Function is further to:
    add a new Network Function to compensate for a faulty Network Function of the Network Slice Instance in use;
    configure another Network Function to compensate for a faulty Network Function of the Network Slice Instance in use;
    apply recovery actions for the faulty Network Function of the Network Slice Instance in use;
    modify existing or create new Network Slice SubNet requirements for self-healing purposes; or
    send the modified or newly created Network Slice SubNet requirements to the Network Slice SubNet Management Function.

11. The apparatus of claim 1, wherein the self-optimization of the Network Slice Instance comprises self-healing, self-reconfiguration and/or new creation of a Network Slice Instance.

12. The apparatus of claim 1, wherein the circuitry to implement the Service Management Function comprises:
    interface circuitry; and
    one or more processors, coupled with the interface circuitry, to:
    receive service requirements from a Customer; and
    send a response to the Customer to indicate whether the service requirements are satisfied.

13. The apparatus of claim 12, wherein the one or more processors, upon receipt of the service requirements from the Customer, are to:
    generate network slice requirements;
    send the network slice requirements to the Network Slice Management Function; and receive a result from the Network Slice Subnet Management Function to indicate whether the network slice requirements are satisfied.

14. The apparatus of claim 1, wherein the Network Slice Management Function is further implemented to modify a network slice template in response to triggering the self-optimization and based at least in part on the monitored performance of the Network Slice Instance.

15. One or more non-transitory computer-readable media comprising instructions to cause an electronic device, upon execution of the instructions by one or more processors of the electronic device, to perform a method for self-optimization of a Network Slice Instance comprising:
    monitoring a performance of the Network Slice Instance in use;
    evaluating whether the Network Slice Instance meets a received set of Network Slice requirements, wherein the received set of Network Slice requirements are received from a Service Management Function or an Operator's target for performance of the Network Slice Instance;
    triggering the self-optimization for the Network Slice Instance based at least in part on the monitored performance of the Network Slice Instance,
    modifying one or more Network Slice SubNet requirements and a network slice template in response to the triggering and based at least in part on the monitored performance of the Network Slice Instance; and
    modifying a Network Slice SubNet Instance based at least in part on the modified one or more Network Slice SubNet requirements for use in the Network Slice Instance in use in order to meet the received set of Network Slice requirements.

16. The one or more non-transitory computer-readable media of claim 15, wherein the method further comprises:
    sending the modified one or more Network Slice SubNet requirements to a Network Slice Subnet Management Function; and
    generating new Network Slice SubNet requirements if a new Network Slice SubNet Instance needs to be created.

17. The one or more non-transitory computer-readable media of claim 15, wherein the method further comprises pre-configuring a policy for a Network Slice Management Function to facilitate network slice re-configuration.

18. The one or more non-transitory computer-readable media of claim 16, wherein the method further comprises, upon receipt of the modified one or more Network Slice SubNet requirements or the new Network Slice SubNet requirements:
    modifying an existing Network Slice Subnet Instance; or
    creating a new Network Slice Subnet Instance for a new Network Slice Instance, if the new Network Slice Subnet Instance is required.

19. The one or more non-transitory computer-readable media of claim 18, wherein the method further comprises:
    instantiating a virtualized constituent Network Function(s) for the new Network Slice Subnet Instance, or the modified existing Network Slice Subnet Instance, if needed; and
    configuring the virtualized constituent Network Function(s) to support the new or modified Network Slice Instance.

20. The one or more non-transitory computer-readable media of claim 15, wherein the method further comprises modifying a network slice template in response to triggering the self-optimization and based at least in part on the monitored performance of the Network Slice Instance.

* * * * *